(12) United States Patent
Zenker et al.

(10) Patent No.: US 9,787,582 B1
(45) Date of Patent: Oct. 10, 2017

(54) CLOUD ROUTER

(71) Applicant: EMC Corporation, Hopkinton, MA (US)

(72) Inventors: Ryan Zenker, Brandon, FL (US);
Braden Gibson, Valrico, FL (US);
Kevin Herrin, Cumming, GA (US);
Ming Zhang, Stoughton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 230 days.

(21) Appl. No.: 14/230,164

(22) Filed: Mar. 31, 2014

Related U.S. Application Data

(60) Provisional application No. 61/931,502, filed on Jan. 24, 2014.

(51) Int. Cl.
*G06F 15/16* (2006.01)
*H04L 12/721* (2013.01)

(52) U.S. Cl.
CPC .................... *H04L 45/44* (2013.01)

(58) Field of Classification Search
CPC .......... G06F 9/505; H04L 65/607; G06T 1/20
USPC ......... 709/223, 217, 224, 226, 219; 707/827
See application file for complete search history.

(56) References Cited

U.S. PATENT DOCUMENTS

| | | | |
|---|---|---|---|
| 8,924,511 B2 | 12/2014 | Brand et al. | |
| 9,027,024 B2 * | 5/2015 | Mick | H04L 43/0817 709/224 |
| 2010/0274772 A1 | 10/2010 | Samuels et al. | |
| 2012/0005193 A1 | 1/2012 | Nemoto et al. | |
| 2012/0233668 A1 * | 9/2012 | Leafe | G06F 9/44526 726/4 |
| 2012/0304244 A1 * | 11/2012 | Xie | G06F 21/00 726/1 |
| 2013/0110778 A1 | 5/2013 | Taylor et al. | |
| 2013/0132948 A1 * | 5/2013 | Hari | G06F 9/45558 718/1 |
| 2013/0204848 A1 | 8/2013 | Akirav et al. | |
| 2014/0007239 A1 | 1/2014 | Sharpe et al. | |
| 2014/0258441 A1 * | 9/2014 | L'Heureux | H04W 12/06 709/217 |
| 2015/0074279 A1 * | 3/2015 | Maes | G06F 9/5072 709/226 |

OTHER PUBLICATIONS

"NIST Cloud Computing Standards Roadmap"—Hogan et al, NIST Cloud Computing Standards Roadmap Working Group, Jun. 2011 https://bigdatawg.nist.gov/_uploadfiles/M0009_v1_7425925966.pdf.*

* cited by examiner

*Primary Examiner* — Randy Scott
(74) *Attorney, Agent, or Firm* — Krishnendu Gupta; Robert Kevin Perkins

(57) ABSTRACT

A computer implemented method, system, and program product comprising presenting, via cloud router, clouds as a single cloud to a client, wherein the client communicates with the single cloud via a client API of the cloud router.

20 Claims, 22 Drawing Sheets

CLOUD ROUTER

RELATED APPLICATIONS

This application claims priority to U.S. Provisional Patent Application No. 61/931,502 titled "Cloud Router" filed on Jan. 24, 2014, which is incorporated in its entirety herein by reference for all purposes. This Application is related to U.S. patent application Ser. No. 14/230,168 entitled "CLOUD MIGRATOR", and application Ser. No. 14/230,173 entitled "CLOUD TIERING", filed on even date herewith, both of which are hereby incorporated herein in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

As it is generally known, "cloud computing" typically refers to the use of remotely hosted resources to provide services to customers over one or more networks such as the Internet. Resources made available to customers are typically virtualized and dynamically scalable. Usually, cloud computing services may include any specific type of application. Conventionally, the software and data used to support cloud computing services are located on remote servers owned by a cloud computing service provider. Recently, use of the cloud computing service model has been growing due to the increasing availability of high bandwidth communication, making it possible to obtain response times from remotely hosted cloud-based services similar to those of services that are locally hosted.

SUMMARY

A computer implemented method, system, and program product comprising presenting, via cloud router, clouds as a single cloud to a client, wherein the client communicates with the single cloud via a client API of the cloud router.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
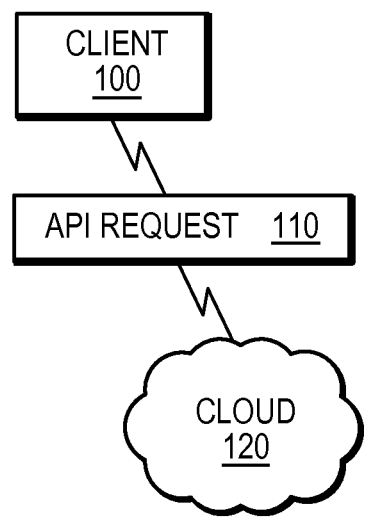
FIG. 1 is a simplified illustration of a client communicating with a cloud, in accordance with an embodiment of the present invention.

Conventionally, clients communicated to a single cloud with an API request. Generally, communicating with multiple clouds simultaneously may not have been possible. Usually, a client would need to keep track of each different cloud and what API was necessary to interact with each different cloud. Typically, read write access to data in a cloud may not have been enabled when the data was being migrated from a first cloud to a second cloud.

Cloud computing infrastructures generally use virtual machines to provide services to customers. Conventionally, a virtual machine is a completely software-based implementation of a computer system that executes programs like an actual computer system. Typically, one or more virtual machines may be used to provide a service to a given customer, with additional virtual machines being dynamically instantiated and/or allocated as customers are added and/or existing customer requirements change. Generally, each virtual machine may represent all the components of a complete system to the program code running on it, including virtualized representations of processors, memory, networking, storage and/or BIOS (Basic Input/Output System). Conventionally, virtual machines may run unmodified application processes and/or operating systems. Generally, a program code running on a given virtual machine may use only virtual resources and abstractions dedicated to that virtual machine. As a result of such "encapsulation", typically a program running in one virtual machine is isolated from programs running on other virtual machines, even though the other virtual machines may be running on the same underlying hardware. Generally, in the context of cloud computing, customer-specific virtual machines can therefore be employed to provide secure and reliable separation of code and data used to deliver services to different customers.

Conventionally, a hypervisor (or "virtual machine monitor") is a system program that provides a virtual environment in which multiple virtual machines can concurrently execute in isolation. Typically, a hypervisor provides the virtual execution environment over a physical "hypervisor domain" made up of one or more underlying host computer systems. The hypervisor generally manages allocation of physical resources from the hypervisor domain to the virtual machines executing in the virtual environment in a way that maintains code and data isolation between virtual machines. Conventionally, the physical resources in the hypervisor domain that are virtualized by the hypervisor for allocation to virtual machines include processor, memory, and other physical resources. Generally, hypervisors are referred to as "Type 1" (or "native" or "bare-metal") hypervisors that run directly on the host's hardware as a hardware control and guest operating system monitor. Other hypervisors are generally referred to as "Type 2" (or "hosted") hypervisors that are software applications running within a conventional operating system environment. In addition to physical resource virtualization and allocation, hypervisors may also provide virtual machines with other specific services, such as transport services enabling communication between virtual machines.

One example of an existing cloud-based storage solution is Amazon Simple Storage Service (S3), which is part of the Amazon Web Services™ offered over the Internet by Amazon.com, Inc. Generally, S3 provides persistent object storage for HTTP access to store and retrieve data. However, once a client has stored significant amounts of data in S3, typically the client may have difficulty migrating that data from one cloud provider to another without impact to their own applications' access to that data.

In certain embodiments, the current disclosure may enable a client to communicate with a single cloud. In some embodiments, the current disclosure may enable a client to communicate with a single cloud using an API request. In some embodiments, an API request to a single cloud may be a key value pair and a request. In some embodiments, the current disclosure may enable a client to communicate with multiple clouds presented as a single cloud by a cloud router. In certain embodiments, the current disclosure may enable read write access to cloud data while the data is being migrated from a first cloud to a second cloud. In most embodiments, a cloud router may be presented to a client as a single cloud, where the cloud router may transparently present multiple clouds as the single cloud to the client. In certain embodiments, a cloud router may distribute API requests sent by a client to the cloud router to multiple clouds transparently to the client. In at least some embodiments, a client may think that it is communicated with a single cloud where a cloud router has transparently represented multiple clouds to the client as a single cloud.

In some embodiments, the current disclosure may enable a client to communicate with a cloud router. In certain embodiments, the cloud router may appear to a client as a cloud. In at least some embodiments, multiple clouds may be transparently presented to a client as a single cloud. In certain embodiments, a client may communicate with a cloud router by sending an API request to a cloud router. In some embodiments, an API request to a cloud router may be a request for an object. In certain embodiments, an API request may include a key value pair and a request. In some embodiments, a cloud router may include a client API, logic, and cloud APIs. In some embodiments, requests to a cloud may be made via HTTP Rest protocol. In certain embodiments, translating a request from a client API to a cloud API may include striping out a key and request. In some embodiments, a request from a client API request may be translated to a cloud API request. In some embodiments, the cloud may an Amazon® Web Service Cloud, a Microsoft® Azure cloud, or another third party cloud.

In some embodiments, the current disclosure may enable a cloud router to route requests between clouds. In other embodiments, objects may be assigned between clouds transparently to a client or user. In further embodiments, objects may be retrieved from different clouds. In some embodiments, objects may be stored in different clouds. In some embodiments, objects may be queried from different clouds. In alternative embodiments, a cloud router may assign objects to a cloud based on a function. In at least some embodiments, a cloud router may retrieve objects based on a function. In some embodiments, a function for a cloud router may be a hash function.

In some embodiments, a cloud router may communicate to a client via a client API. In some embodiments, a client API may receive an API request from a client. In further embodiments, a client API may receive a key value pair and a request from a client.

In certain embodiments, a cloud router may translate a request from a client API to a request to a cloud API. In at least some embodiments, the current disclosure may enable creation of mapping API requests to different clouds. In certain embodiments, a map may correspond to buckets. In some embodiments, there may be 4,096 buckets. In at least some embodiments, combinations of 12 bits of the hash may be used for finding a bucket. In some embodiments, a bucket may be mapped to one of multiple clouds. In some embodiments, other data structures, such as a table or a list of pointers, may be used to map an API request to one of multiple clouds. In other embodiments, a bucket may be mapped to multiple clouds.

In some embodiments, other data structures, such as a table or a list of pointers, may be used to map buckets to multiple clouds. In at least some embodiments, the current disclosure may enable access to a table that contains a mapping of buckets to multiple clouds. In certain embodiments, objects may be represented as stored in a single cloud while the objects may be stored in separate clouds. In at least one embodiment, clouds may contain billions of objects. In other embodiments, the current disclosure may enable presenting billions of objects as stored in one cloud when the objects may be stored in separate clouds. In some embodiments, a cloud router may translate requests from different cloud APIs to a client API.

In some embodiments, there may be a data service which may offer block, file, and object storage. In certain embodiments, the data services may publish the data services available. In most embodiments, the current disclosure may enable managing of security. In some embodiments, a cloud router may apply authentication methods to API requests. In further embodiments, metering and monitoring the data use for the clouds may be enabled. In further embodiments, bandwidth of requests to the clouds may be monitored. In particular embodiments, services available in the cloud may be published. In most embodiments, the published information may be available in the API via an API server.

In certain embodiments, a client may make a request to a client API by a making a request with a key value pair. In some embodiments, the client API may validate the request. In at least some embodiments, a client API may hash a key associated with the request. In at least one embodiment, a hash may be used to reference a bucket. In most embodiments, a bucket may provide a map based on a hash to a cloud. In further embodiments, the client API may use the hash and corresponding bucket to determine a cloud. In certain embodiments, a client API may translate a request from the client API to a cloud API. In some embodiments, buckets may be created. In method embodiments, buckets may be assigned to clouds.

In some embodiments, the cloud router may be used to perform tiering of data across clouds. In many embodiments, each cloud may have different access characteristics. In certain embodiments, a cloud's access characteristics may include reliability, access speed, and cost. In at least one embodiment, the cloud router may have a function to balance data storage based on one or more of reliability of the cloud, speed of the cloud, and cost of storage in the cloud.

In further embodiments, data tiering may be used to push data accessed more often to a faster cloud while moving colder or stale data to a slower less costly cloud. In some embodiment, the cloud router may ensure accessibility to the data while the data is being migrated from between clouds of different capabilities. In many embodiments, a cloud router may passively migrate data while a cloud migrator actively migrates data between clouds. In certain embodiment, the cloud router may search for data in both of the clouds while the data is being migrated while the cloud migrator migrates the data. In at least one embodiment, the map in the cloud router may point to two clouds having the same data. In further embodiments, a fast cloud may be used as a cache for data that is accessed often or is hot data. In certain embodiments, some data may be marked as unimportant and migrated to slower less costly data. In at least one embodiment, certain data may be marked as important and kept in a faster cloud. In other embodiments rarely accessed data may be kept in an archive cloud. In certain embodiments, data actively accessed may be kept in a fast cache cloud. In further embodiments, data may be moved between clouds based on service level agreements. In still further embodiments, data may be moved between clouds based on guaranteed availability.

Co-owned application Ser. Nos. 12/494,622, 12/640,244, 12/639,469 and 12/640,244, titled "FACILITATING DATA MIGRATION BETWEEN TIERS," "AUTOMATED DATA RELOCATION AMONG STORAGE TIERS BASED ON STORAGE LOAD," "LOGICAL UNIT MIGRATION ASSISTANT FOR HARDWARE-BASED STORAGE TIERING," and "AUTOMATED DATA RELOCATION AMONG STORAGE TIERS BASED ON STORAGE LOAD," respectively, provide a description of Fully Automated Storage Tiering (FAST) and are hereby incorporated by reference in their entirety. The techniques described in the aforementioned applications may be applied to data in the clouds to enable data migration based on the access characteristics of the data and the characteristics of the cloud.

Refer now to the example embodiment of FIG. 1, which is a simplified illustration of a client communicating with a cloud. In FIG. 1, cloud 120 is depicted as an object storage cloud. Client 100 communicates requests to cloud 120 using API request 110 over an HTTPS rest protocol. The requests contain a key value pair and an object request.

Figure 2:
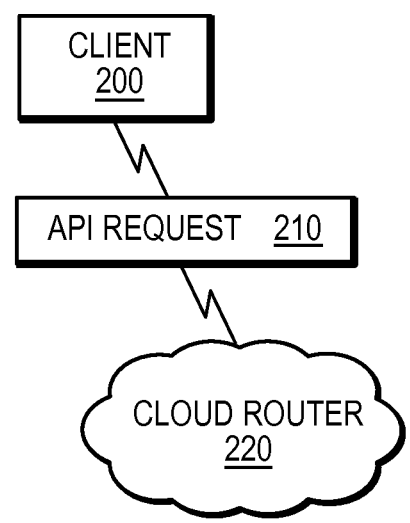
FIG. 2 is a simplified illustration of a client communicating with a cloud router, in accordance with an embodiment of the present invention.

Refer now to the example embodiment of FIG. 2, which illustrates a client communicating with a cloud router. Cloud router 220 appears as a cloud to client 200. Client 200 communicates with cloud router 220 using API request 210. Client 200 has authentication credentials to authenticate itself to the cloud router. Cloud router 220 is enabled to validate the credentials and ensure client 200 has the permissions to make the API request 210 to cloud router 220.

Figure 3:
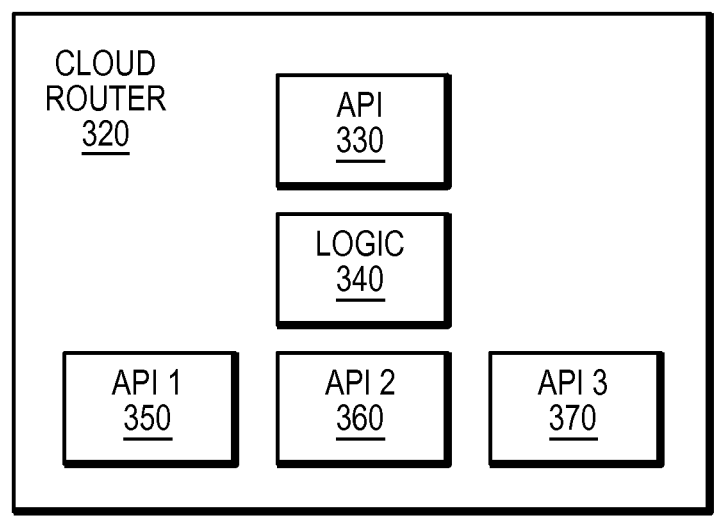
FIG. 3 is a simplified illustration of a cloud router with API and logic, in accordance with an embodiment of the present invention.

Refer now to the example embodiment of FIG. 3, which illustrates a cloud router. In the example embodiment of FIG. 3, cloud router 320 has API 330, logic 340, API 1 350, API 2 360, and API 3 370. API 330 is enabled to receive API requests from client 300. Client 300 has one set of authentication credentials. API 330 is enabled to validate the credentials and ensure that client 300 has the permissions to make the API request. Logic 340 is enabled to translate the API request from client 300 received via API 330 to an API request for API 1 350, API 2 360, and API 3 370.

Figure 4:
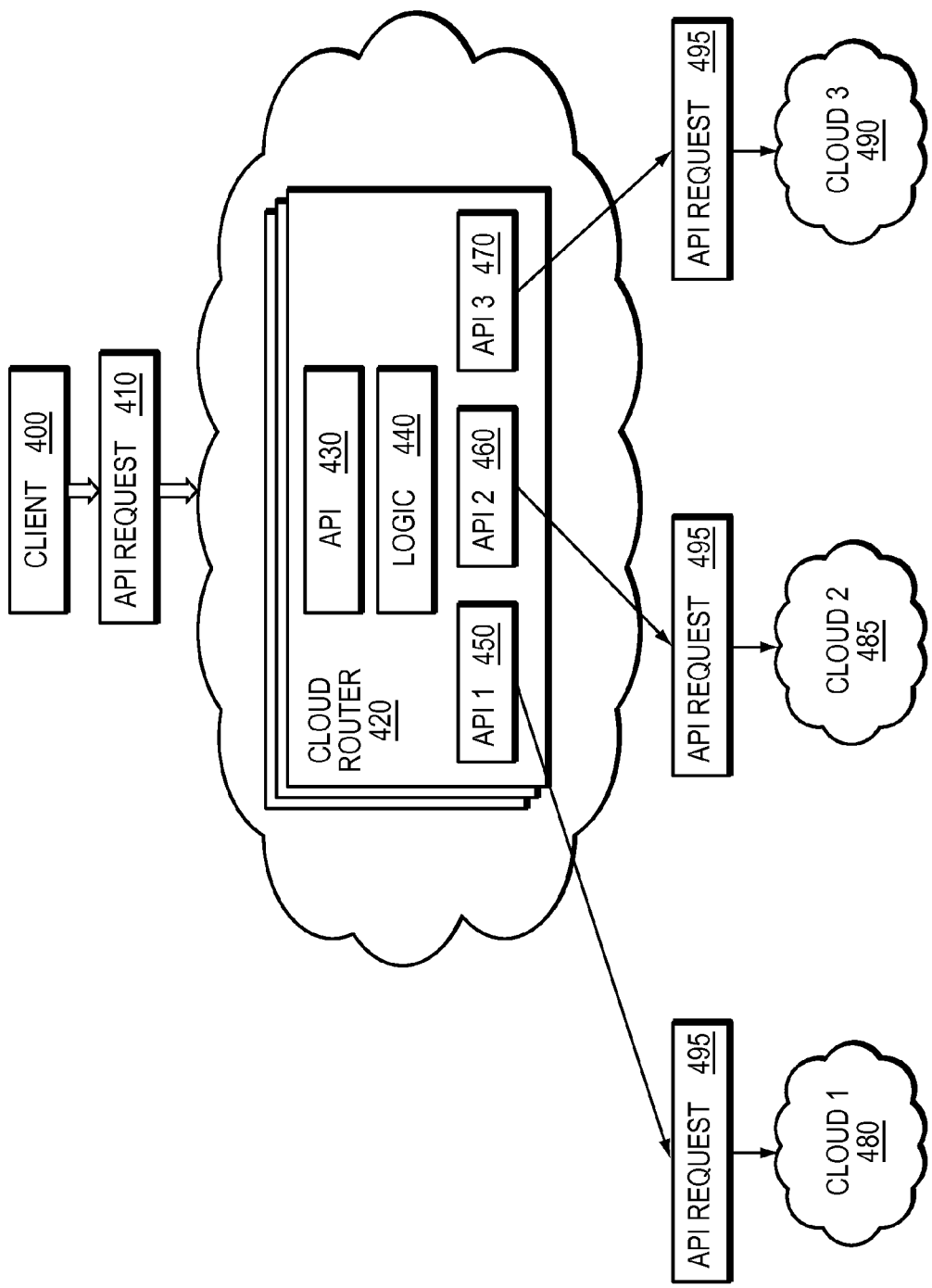
FIG. 4 is a simplified illustration of a cloud router with API and logic in communication with clouds, in accordance with an embodiment of the present invention.

Refer now to the example embodiment of FIG. 4, which illustrates a client communicating with multiple clouds as a single cloud using a cloud router. Cloud router 420 has API 430, logic 440, API 1 450, API 2 460, API 470. Cloud router is communicatively coupled to cloud 1 480, cloud 2 485, and cloud 3 490. In the example embodiment of FIG. 4, client 400 communicates with API 430 by sending API request 410 to API 430. Client 400 has one set of authentication credentials. API 430 is enable to validate the credentials and ensure API request 410 that client 400 made to API 430 is valid. Logic 440 is enabled to map the API request to one or more of cloud 1 480, cloud 2 485, and cloud 3 490. Based on the map of the API, logic 440 is enabled to translate the API request from API 430 to API requests for any of API 1 450, API 2 460, and API 3 470. Further in the illustration, API 1 450, API 2 460, and API 3 470 are enabled to communicate the translated API requests to cloud 1 480, cloud 2 485, and cloud 3 490.

Figure 5:
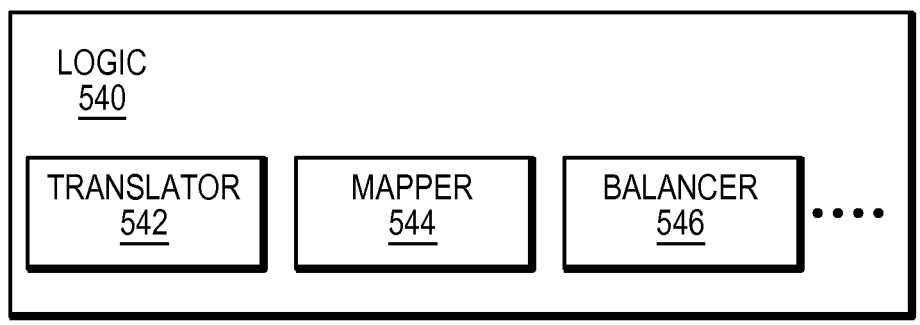
FIG. 5 is a simplified illustration of an implementation of a cloud router, in accordance with an embodiment of the present invention.

Refer now to the example embodiments of FIG. 4 and FIG. 5, which illustrate sample functionality included in the logic of a cloud router. In the example embodiment of FIG. 5, logic 540 has a translator 542, mapper 544, and balancer 546. Translator 542 is enabled to translate requests from a client API, such as requests received by API 430, to requests for a cloud API, such as API 1 450, API 2 460, and API 3 470. Mapper 544 is enabled to map API requests received from a client to one or more available clouds, such as cloud 1 480, cloud 2 485, and cloud 3 490. Balancer 546 is enabled to balance the mapping of client API requests across clouds, such as cloud 1 480, cloud 2 485, and cloud 3 490. In certain embodiments, balancer is able to rebalance mappings of mapper to ensure equal distribution of objects and or requests across clouds.

Figure 6:
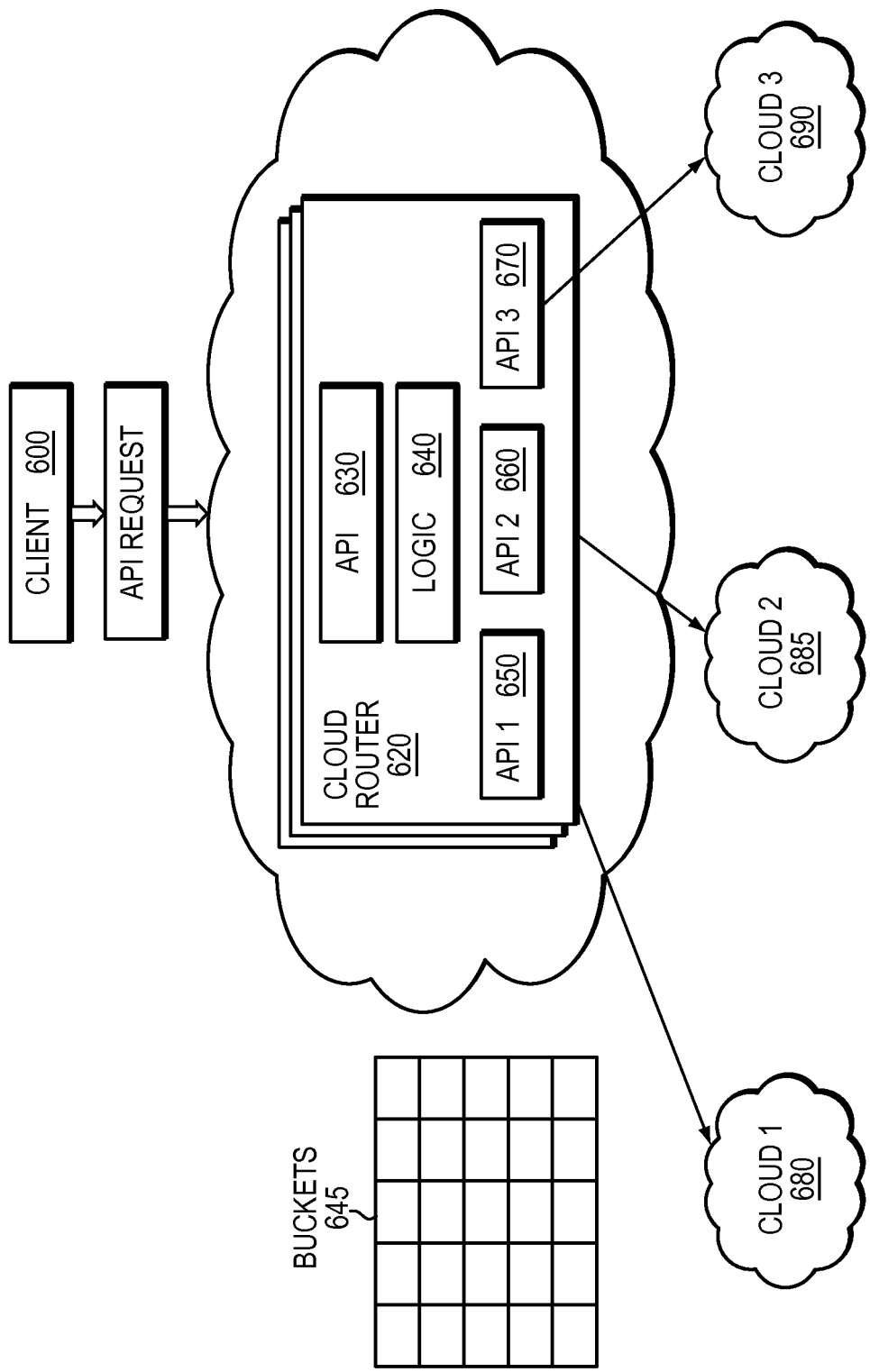
FIG. 6 is a simplified illustration of a cloud router with API and logic and mapping buckets, in accordance with an embodiment of the present invention.
Figure 7:
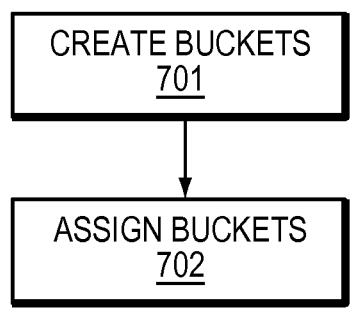
FIG. 7 is a simplified method for creating and assigning buckets, in accordance with an embodiment of the present invention.

Refer now to the example embodiment of FIG. 6 and FIG. 7, which illustrate a client communicating with multiple clouds using a cloud router. Cloud router 620 has API 630, logic 640, API 1 650, API 2 660, API 670. Cloud router 620 is communicatively coupled to cloud 1 680, cloud 2 685, and cloud 3 690. Buckets 645 are created. Buckets 645 are assigned to one or more of cloud 1 680, cloud 2 685, and cloud 3 690 (step 702). The buckets 645 create a mapping of API requests to cloud 1 680, cloud 2 685, and cloud 3 690 through the use of a hash function, which hashes a value associated with the request. Logic 640 is enabled to use buckets 645 to map API requests from client 600 to one or more of cloud 1 680, cloud 2 685, and cloud 3 690.

Figure 8:
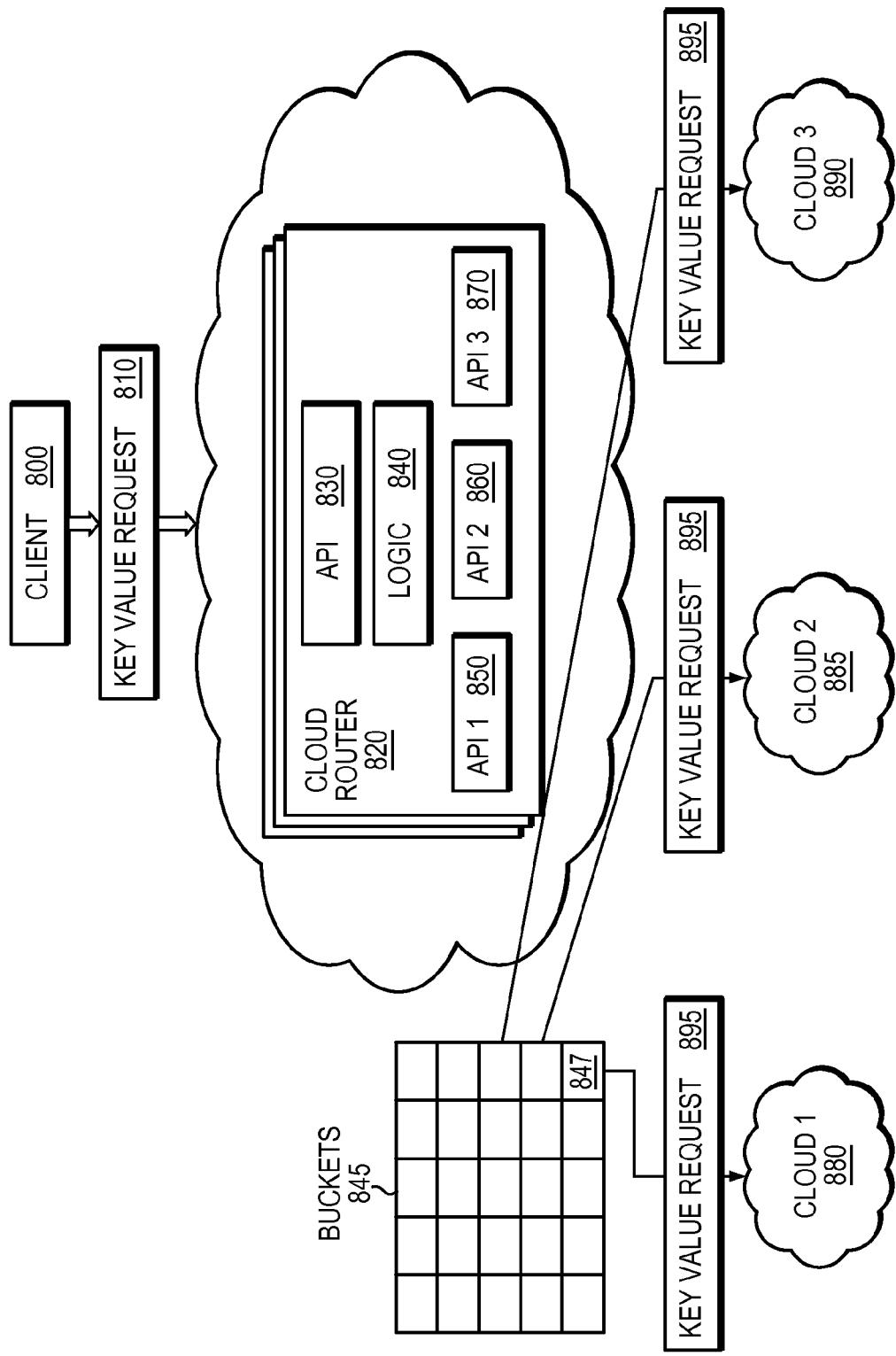
FIG. 8 is a simplified illustration of a client making a key value pair and a request to a cloud router, in accordance with an embodiment of the present invention.
Figure 9:
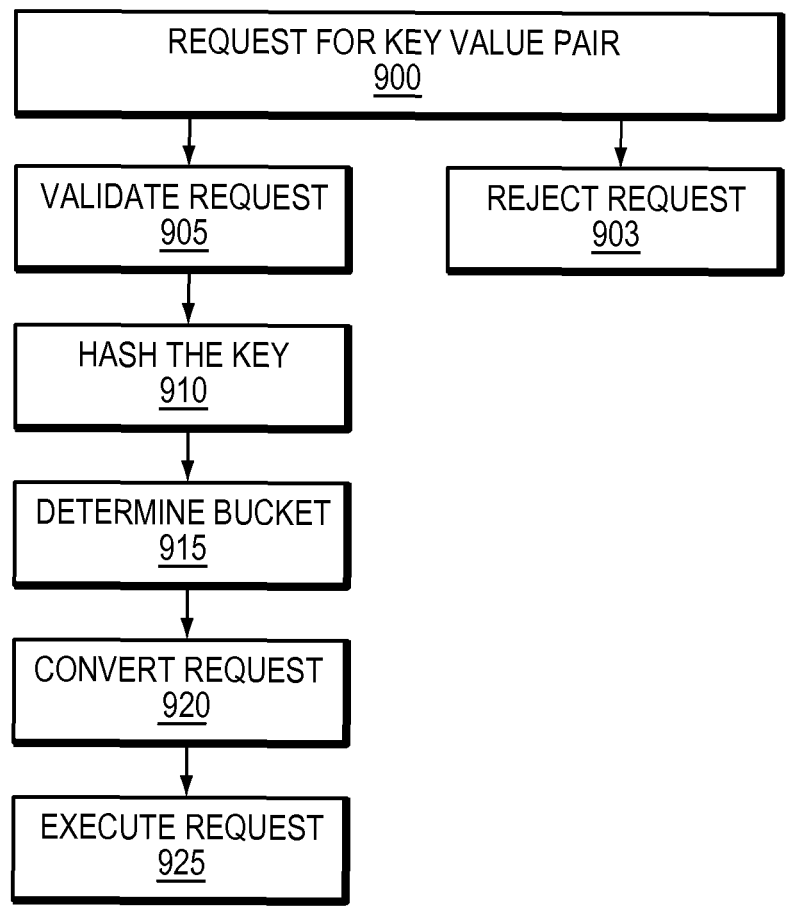
FIG. 9 is a simplified method for making a key value pair and a request, in accordance with an embodiment of the present invention.

Refer now to the example embodiments of FIG. 8 and FIG. 9, which illustrates a client communicating with multiple clouds using a cloud router. Cloud router 820 has API 830, logic 840, API 1 850, API 2 860, API 870. Cloud router 820 is communicatively coupled to cloud 1 880, cloud 2 885, and cloud 3 890. In these example embodiments, buckets 845 are mapped to cloud 1 880, cloud 2 885, and cloud 3 890. In these example embodiments, each bucket of buckets 845 is mapped to one or more of cloud 1 880, cloud 2 885, and cloud 3 890. In these example embodiments, client 800 communicates with API 830 by sending key value pair request 810 to API 830 (step 900). Cloud Router 820 validates credentials in API request 810 and ensures that client 800 has permission to make request 810. If client 800 has permission, cloud router 820 validates request 810 (step 905). If client 800 does not have permission, cloud router 820 rejects request 810 (step 903). If API request 810 is validated, cloud router 820 strips out a key and object from request 810. Cloud Router 820 hashes the key (step 910). Based the resulting hash, it is determined that bucket 847 of buckets 845 corresponds to the hash. Bucket 847 indicates to which cloud 1 880, cloud 2 885, and cloud 3 890 (step 915) the API should be sent. The key value pair request from API 830 is translated to key value pair requests for the API of API 1 850, API 2 860, and API 3 870 (step 920) associated with the cloud indicated by the bucket. That is the API request is translated to the API for the cloud to which the request is to be sent.

Figure 10:
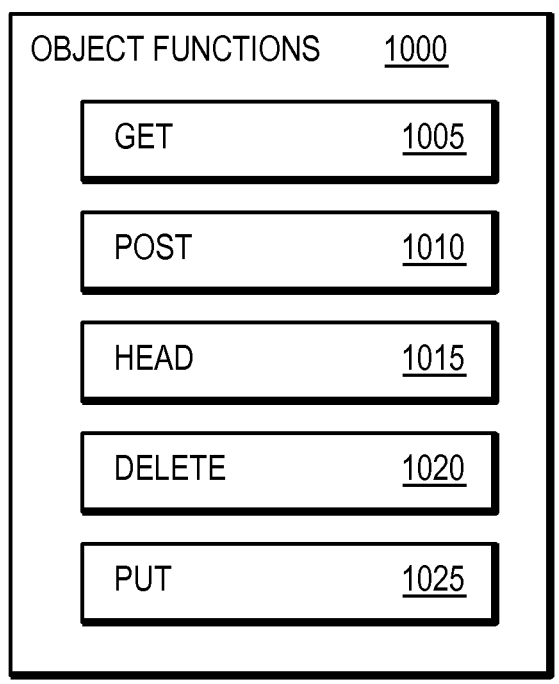
FIG. 10 is a simplified illustration of object functions for a cloud, in accordance with an embodiment of the present invention.

Refer now to the example embodiment of FIG. 10, which illustrates some sample commands that may be available in a cloud. Object functions 1000 include get 1005, which gets an object; post 1010, which posts an object; head 1015; delete 1020, which deletes an object; and put 1025, which updates an object.

Figure 11:
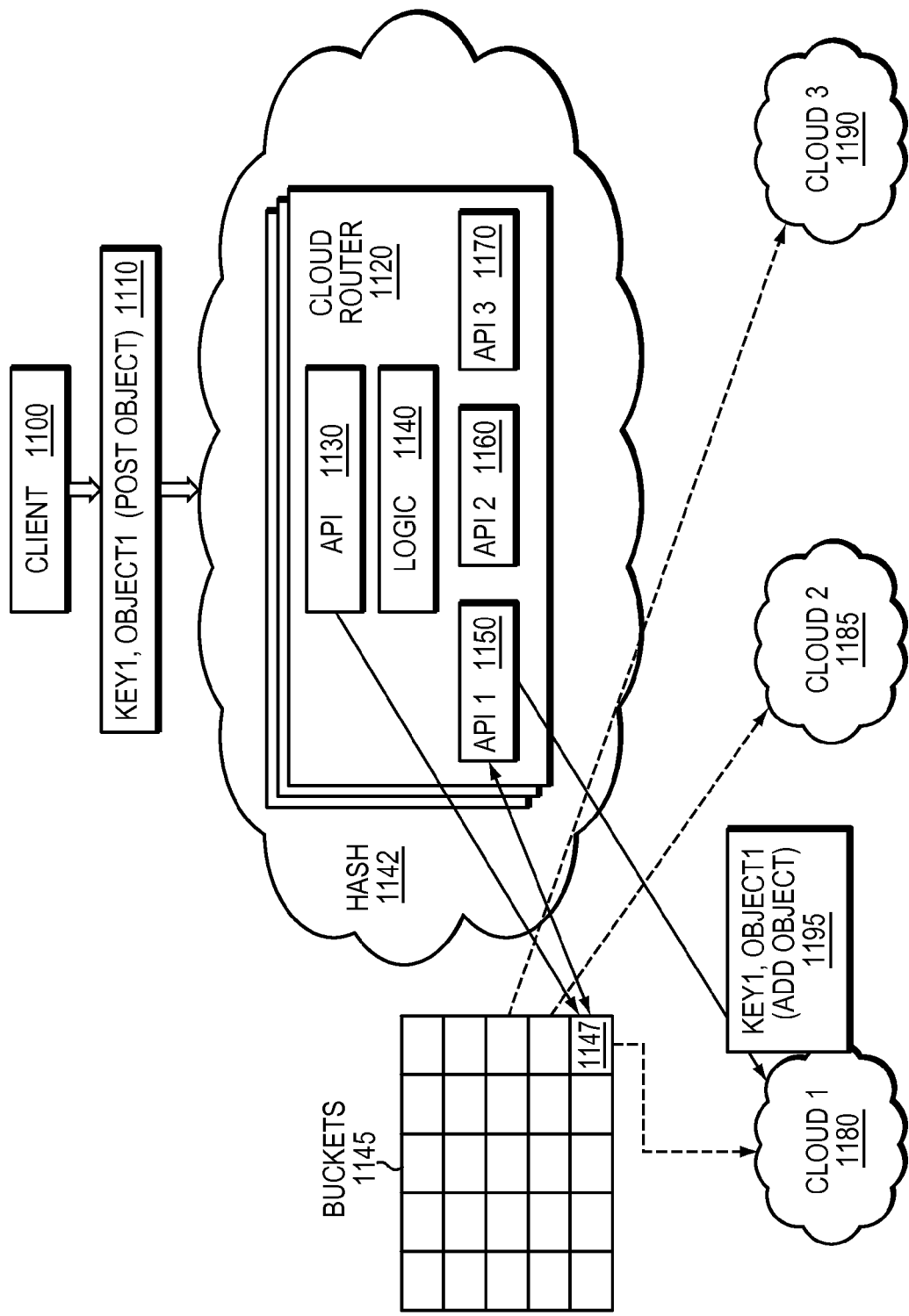
FIG. 11 is a simplified illustration of a client making an add object request to a cloud router, in accordance with an embodiment of the present invention.

Refer now to the example embodiments of FIG. 9 and FIG. 11, which illustrates a client communicating by sending an API request to a cloud router. In FIG. 11, Cloud router 1120 has API 1130, logic 1140, API 1 1150, API 2 1160, API 3 1170. Cloud router 1120 is communicatively coupled to cloud 1 1180, cloud 2 1185, and cloud 3 1190. In the example embodiment, buckets 1145 provide a map to cloud 1 1180, cloud 2 1185, and cloud 3 1190. In these embodiments, Client 1100 sends API request 1110 to cloud router 1120 (step 900). Cloud router 1120 validates API request 1110. Cloud Router 1120 hashes the key in API request 1110 (step 910). Based on the hash of the key, Cloud Router 1120 determines bucket 1147 of buckets 1145 corresponds to the hash (step 915). Cloud router 1120 converts API request 1110 into API request 1195 for API 1150 of cloud 1180 (step 920). Cloud router 1120 executes converted API request 1195 by sending the request to Cloud 1180 (step 925).

Figure 12:
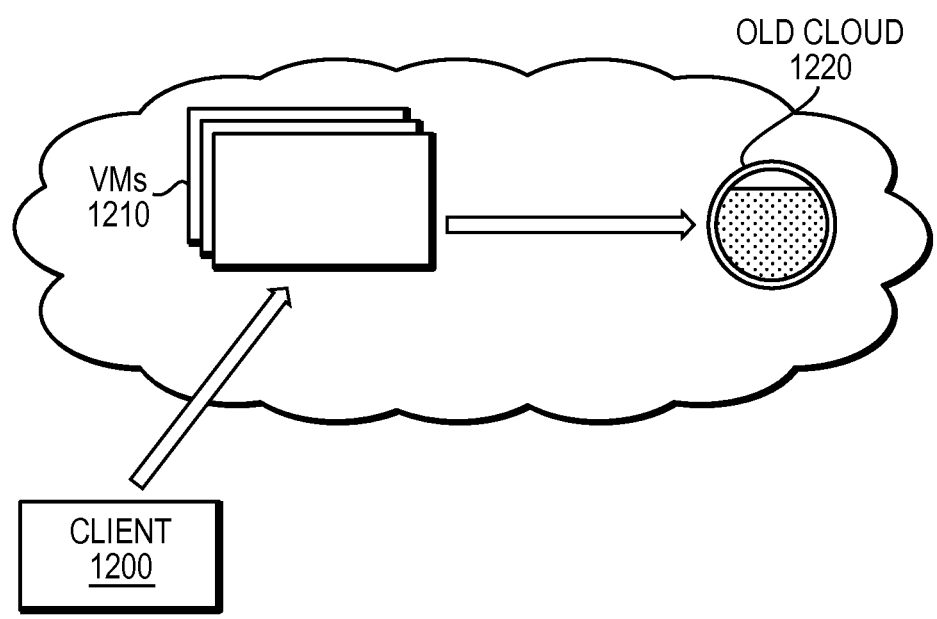
FIG. 12 is a simplified illustration of a client communicating to a cloud, in accordance with an embodiment of the present invention.

Refer now to the example embodiment of FIG. 12, which illustrates a client communicating with VMs in a cloud. Client 1200 communicates with VMs 1210. VMs 1210 are communicatively coupled with OLD cloud 1220.

Figure 13:
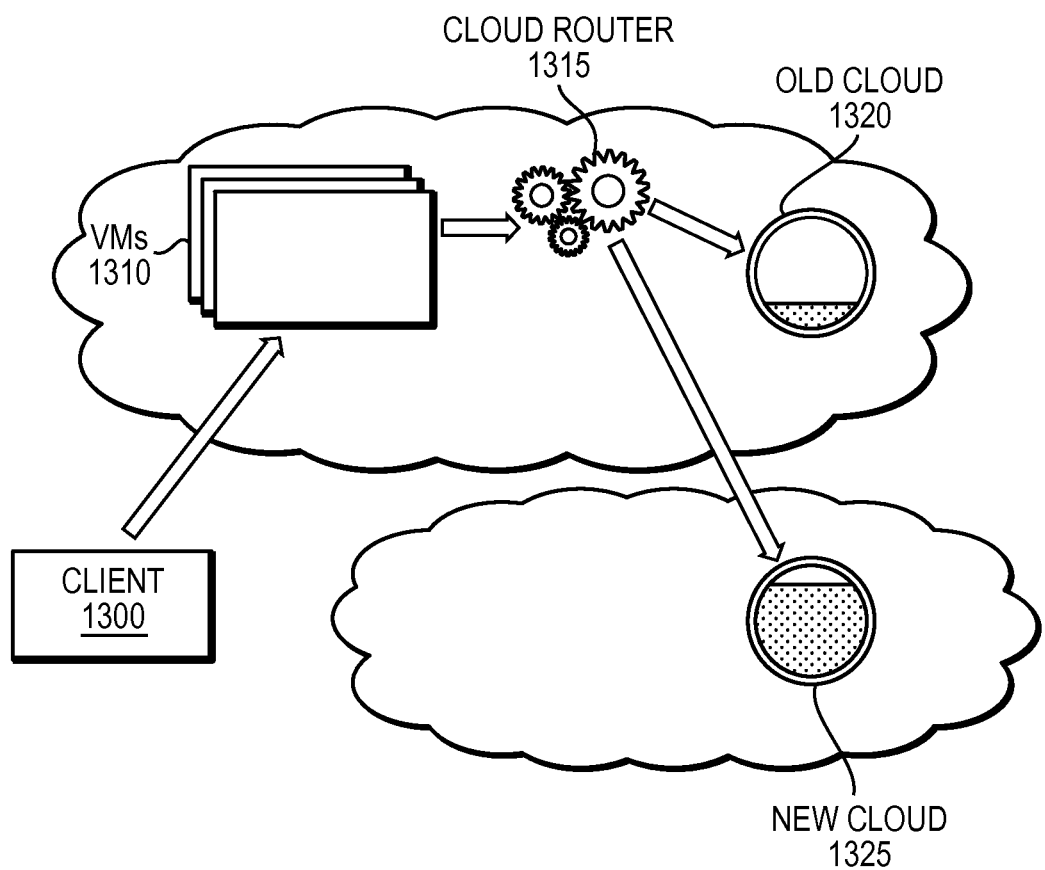
FIG. 13 is a simplified illustration of inserting a cloud router between a client and a cloud to enable cloud migration, in accordance with an embodiment of the present invention.

Refer now to the example embodiments of FIG. 13. In the example embodiment of FIG. 13, a decision has been made to passively migrate the data from old cloud 1320 to new cloud 1325. In the example embodiment of FIG. 13, cloud router 1315 has been placed between VMs 1310 and old cloud 1320. Cloud router 1315 is communicatively coupled to new cloud 1325.

Figure 14:
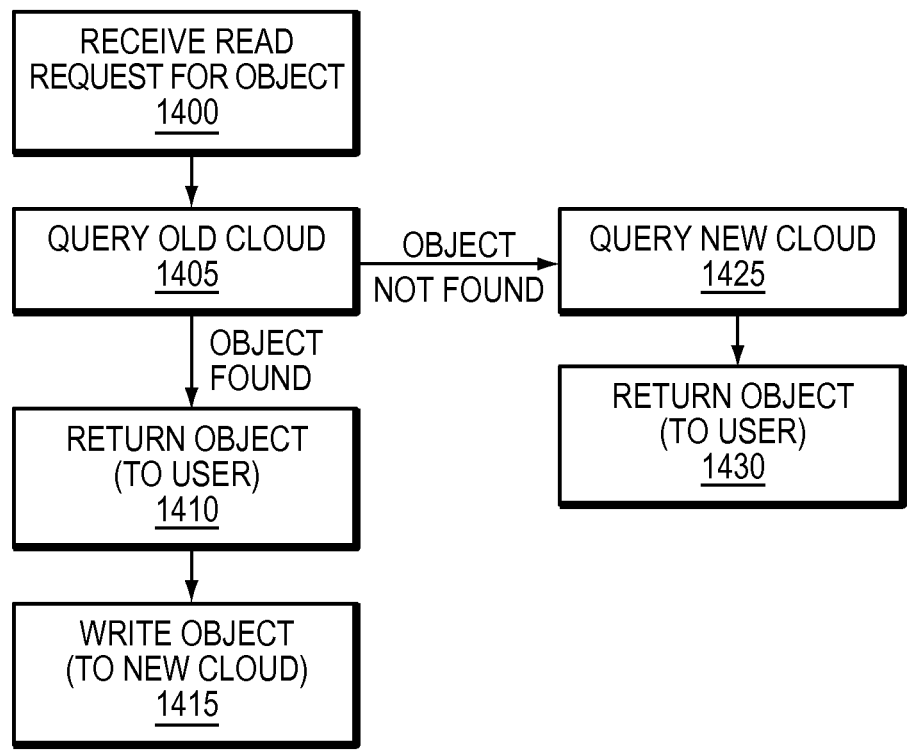
FIG. 14 is a simplified method for reading an object from a cloud during a cloud migration, in accordance with an embodiment of the present invention.
Figure 15:
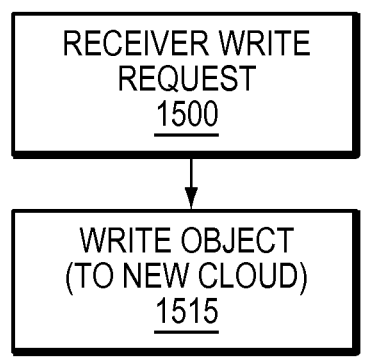
FIG. 15 is a simplified method for writing an object to a cloud during a cloud migration, in accordance with an embodiment of the present invention.

Refer now as well to FIG. 14. Cloud router 1315 receives a read request for old cloud 1320 (Step 1400). Cloud router 1315 queries old cloud 1320 for the data requested in the read request (step 1405). If the data is found in old cloud 1320, cloud router 1315 returns the response to the read request to client 1300. Cloud router writes the object to new cloud 1325 (step 1415). Cloud router 1315 deletes the data from old cloud 1320 (step 1420). If the data is not found in the old cloud, cloud router queries new cloud 1325 for the data (Step 1425). Cloud router 1315 returns the data to the user from new cloud 1325 (step 1430). Refer now as well to the example embodiment of FIG. 15. Cloud router 1315 receives a write request for old cloud 1320 (Step 1500). Cloud router redirects the write request for old cloud 1320 to new cloud 1325 and writes the object to new cloud 1325 (step 1515). In the example embodiments of FIGS. 13-15 cloud data may be passively migrated from an old cloud to a new cloud.

In many embodiments, a cloud router may have a map to where data is stored. In most embodiments, when data is being migrated between clouds, a map in a cloud router may indicate that the data may be present in either the old cloud or the new cloud.

Figure 16:
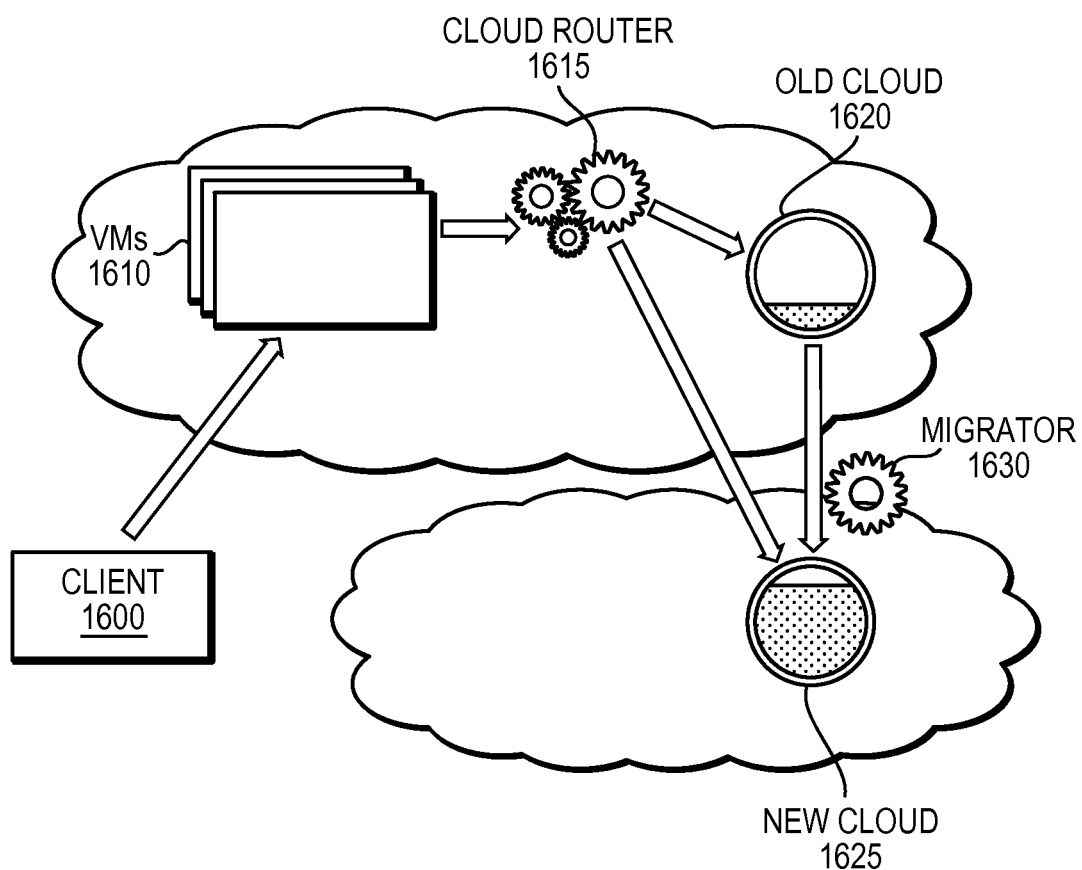
FIG. 16 is a simplified illustration of inserting a cloud router between a client and a cloud, and inserting a cloud migrator between a new cloud and an old cloud, in accordance with an embodiment of the present invention.

Refer now to the example embodiment of FIG. 16. In the example embodiment of FIG. 16, migrator 1630 is communicatively coupled to old cloud 1620 and new cloud 1625. Migrator 1630 reads object from old cloud 1620 (step 1700). Migrator 1630 writes object to new cloud 1625 (1715). Migrator 1630 deletes object from old cloud 1620 (1720). Migrator 1630 continues the method outlined in the example embodiment of FIG. 17 until all objects have been transferred from old cloud 1620 to new cloud 1625. Cloud router 1615 is able to provide access to the data in both old cloud 1620 and 1625 by querying the old cloud and new cloud for any requested data. In this way, cloud router 1615 is able to find the data regardless if the data is in old cloud 1620 or has been migrated to new cloud 1625.

In certain embodiments, a cloud router may maintain access to data during a migration by polling both the source and target cloud of a data migration. In some embodiments, as data is migrated by a migrator, a mapping in a cloud router may be updated to indicate that data has been transferred between clouds.

Figure 18:
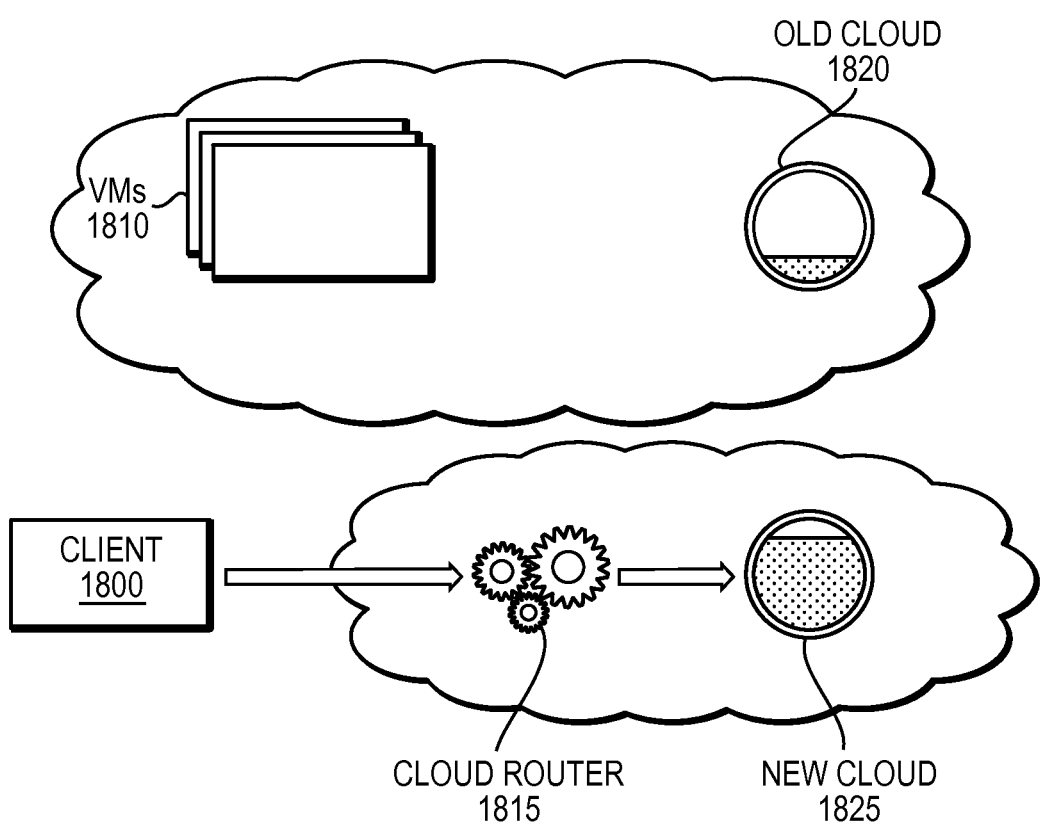
FIG. 18 is a simplified illustration of inserting a cloud router between a client and a new cloud, in accordance with an embodiment of the present invention.

Refer now to the example embodiment of FIG. 18. In the example embodiment of FIG. 18, cloud router 1815 has been placed between client 1800 and new cloud 1825. The data from old cloud 1820 has been migrated to new cloud 1825 and old cloud 1820 and VMs 1810 may be inactive.

Figure 19:
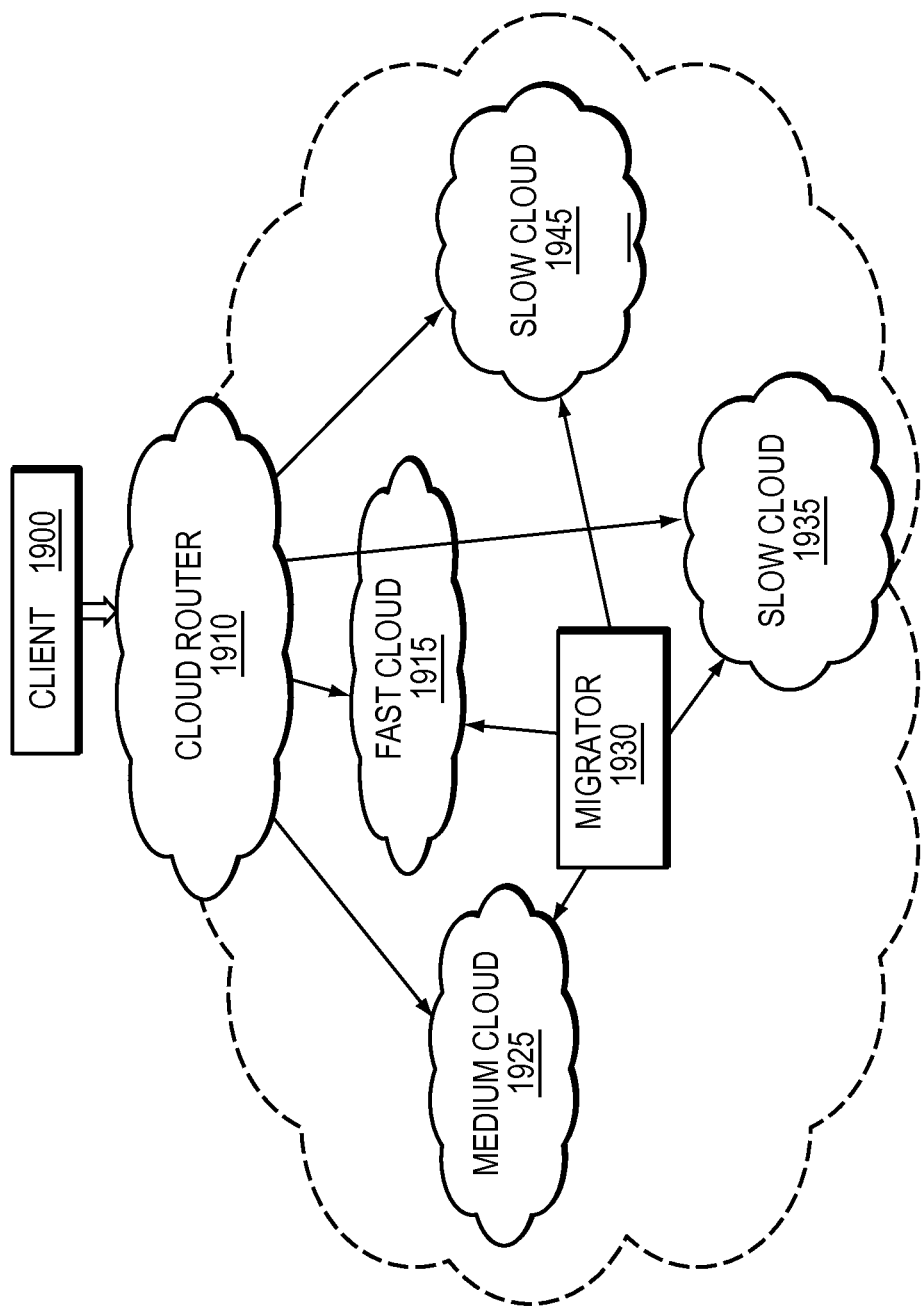
FIG. 19 is a simplified illustration of a cloud router presenting clouds with different performance characteristics as a single cloud, in accordance with an embodiment of the present invention.

Refer now to the example embodiment of FIG. 19, which illustrates a cloud router presenting clouds of different performance characteristics as a single cloud. Cloud router 1910 presents fast cloud 1915, medium cloud 1925, slow cloud 1935, and slow cloud 1945 as a single cloud. Migrator 1930 is communicatively coupled to fast cloud 1915, medium cloud 1925, slow cloud 1935, and slow cloud 1945. Cloud router 1910 is enabled to notify migrator 1930 to migrate data between clouds. Cloud router 1910 enabled to allow access to data in the clouds while the data is being migrated.

Figure 20:
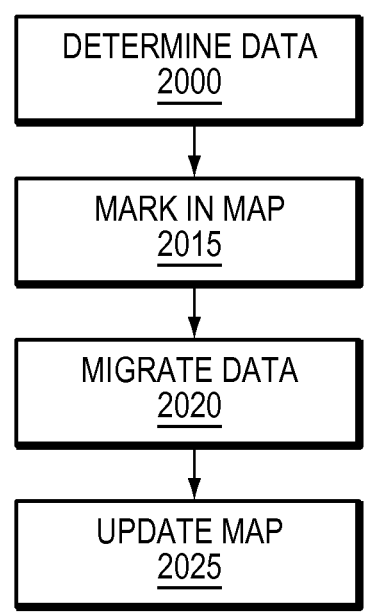
FIG. 20 is a simplified method for transparently migrating data between clouds with different performance characteristics, in accordance with an embodiment of the present invention.

Refer now as well to the example embodiment of FIG. 20, which illustrates a sample migration. Data is determined to be needed to be moved from fast cloud 1915 to slow cloud 1935 (step 2000). In this embodiment, a determination has been made that this data is cold or that this data is infrequently accessed. Cloud router 1910 marks the map corresponding to the location of the data to indicate that the data may be located in both fast cloud 1915 and slow cloud 1935 (step 2015). Migrator 1930 migrates data from fast cloud 1915 to slow cloud 1935 (step 2020). In certain embodiments, migrator 1930 may employ the example method in FIG. 17 to migrate the data. In some embodiments, cloud router 1910 may also passively migrate the data using the methods embodied in FIGS. 14 and 15. Upon completion of the migration of the data from fast cloud 1915 to slow cloud 1935, cloud router 1910 updates the map to the data to indicate that the data is located in slow cloud 1935 (step 2025).

Figure 21:
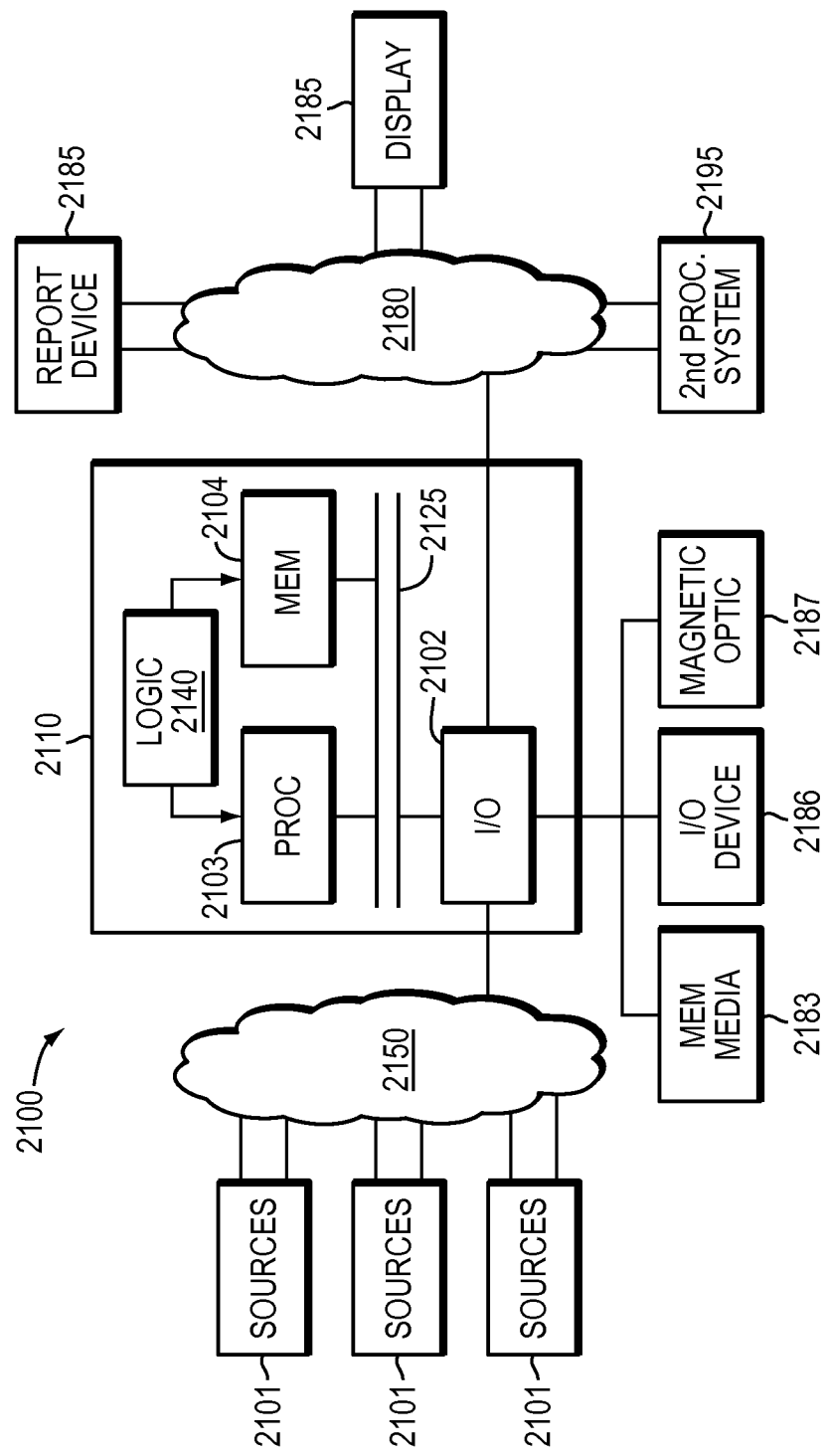
FIG. 21 is an example of an embodiment of an apparatus that may utilize the techniques described herein, in accordance with an embodiment of the present disclosure.
Figure 22:
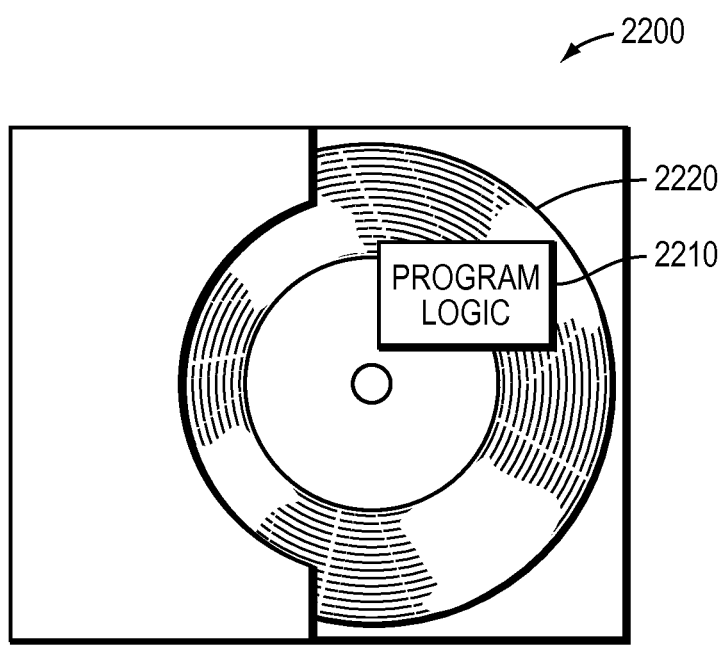
FIG. 22 is an example of an embodiment of a method embodied on a computer readable storage medium that may utilize the techniques described herein in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 21, the machine becomes an apparatus for practicing the invention. When implemented on one or more general-purpose processors, the program code combines with such a processor 2103 to provide a unique apparatus that operates analogously to specific logic circuits. As such a general purpose digital machine can be transformed into a special purpose digital machine. FIG. 22 shows Logic 2210 embodied on a computer-readable medium 2220 as shown, and wherein the Logic is encoded in computer-executable code configured for carrying out the reservation service process of this invention and thereby forming a Computer Program Product 2200. The Logic 2210 may be the same logic 2140 on memory 2104 loaded on processor 2103. The program logic may also be embodied in software modules, as modules, or as hardware modules. The program logic may be run on a physical or virtual processor.

Figure 17:
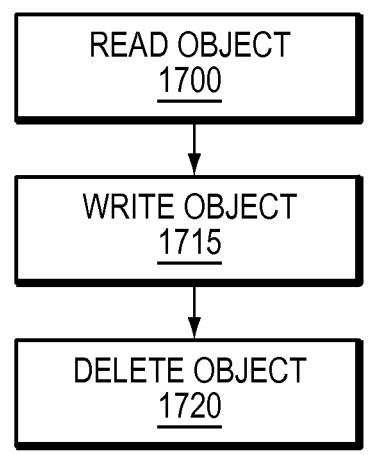
FIG. 17 is a simplified method for migrating objects from an old cloud to a new cloud, in accordance with an embodiment of the present invention.

The logic for carrying out the method may be embodied as part of the system described below, which is useful for carrying out a method described with reference to embodiments shown in, for example, FIG. 14, FIG. 17 and FIG. 20. For purposes of illustrating the present invention, the invention is described as embodied in a specific configuration and using special logical arrangements, but one skilled in the art will appreciate that the device is not limited to the specific configuration but rather only by the claims included with this specification.

The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A system, comprising:
  a cloud router having a client API; and
  computer-executable logic for execution across one or more processors for: presenting, by the cloud router, clouds as a single cloud to a client, wherein the client communicates to the single cloud with the client API, wherein the cloud router further comprises cloud APIs, wherein each respective cloud API of the cloud APIs provides communication capabilities with a cloud of the clouds; and
  in response to a request to the client API, translating the request to the client API to a request for each cloud API of the cloud APIs; wherein the translating translates the client API to each of the cloud APIs when the client API and the each of the cloud APIs have different API requests.

2. The system of claim 1, wherein the computer-executable logic is further for:
  creating buckets, wherein each of the buckets is mapped to one of the clouds, wherein each bucket corresponds to a hash value, and wherein the buckets map a client API requests to one of the clouds using a hash value associated with the API request enabling client API requests to be mapped across the clouds.

3. The system of claim 1, wherein cloud router comprises a cloud balancer, wherein the cloud balancer balances the mapping of buckets to the clouds to enable distributions of client API requests across the clouds.

4. The system of claim 1, wherein the computer-executable logic is further configured for:
  sending a request to the cloud router, wherein the request is sent by the client; and
  making a determination whether the client has permission to make the request.

5. The system of claim 4, wherein the computer-executable logic is further configured for:
  validating the request from the client, wherein the validation is based upon making the determination whether the client has permission to make the request; and
  rejecting the request from the client, wherein the rejection is based upon making the determination whether the client has permission to make the request.

6. A computer implemented method comprising:
  presenting, via cloud router, clouds as a single cloud to a client, wherein the client communicates with the single cloud via a client API of the cloud router; wherein each respective cloud API of the cloud APIs provides communication capabilities with a cloud of the clouds; and in response to a request to the client API, translating the request to the client API to a request for each cloud API of the cloud APIs; wherein the translating translates the client API to each of the cloud APIs when the client API and the each of the cloud APIs have different API requests.

7. The method of claim 6, further comprising:
creating buckets;
mapping each bucket of the buckets to one of the clouds; and
assigning each bucket of the buckets a hash value, wherein the buckets map a client API request to one of the clouds using the hash value associated with the API request which map client API requests to clouds.

8. The method of claim 6, further comprising:
balancing, via a cloud balancer, the mapping of buckets to the clouds to distribute client API requests across the clouds.

9. The method of claim 6 further comprising:
sending a request to the cloud router, wherein the request is sent by the client; and
making a determination whether the client has permission to make the request.

10. The method of claim 9 further comprising:
validating the request from the client, wherein the validation is based upon making the determination whether the client has permission to make the request; and
rejecting the request from the client, wherein the rejection is based upon making the determination whether the client has permission to make the request.

11. The method of claim 9 further comprising:
hashing the key in the request;
determining a bucket that corresponds to the hashed key;
converting the request into a request for a cloud; and
executing the converted request, wherein the request is executed by sending the request to the cloud.

12. The method of claim 7 further comprising:
mapping the buckets to at least one cloud.

13. A computer program product for use in a cloud router comprising;
a non-transitory computer readable medium encoded with computer executable program code for using read signatures in a cloud router, the code configured for execution of; presenting, via cloud router, clouds as a single cloud to a client, wherein the client communicates with the single cloud via a client API of the cloud router; wherein each respective cloud API of the cloud APIs provides communication capabilities with a cloud of the clouds; and in response to a request to the client API, translating the request to the client API to a request for the cloud API; wherein tire translating translates the client API to each of the cloud APIs when the client API and the each of the cloud APIs have different API requests.

14. The computer program product of claim 13, wherein the code is further configured for execution of:
creating buckets;
mapping each bucket of the buckets to one of the clouds; and
assigning each bucket of the buckets a hash value, wherein the buckets map a client API requests to one of the clouds using a hash value associated with the API request enabling client API requests to be mapped across the clouds.

15. The computer program product of claim 13, wherein the code is further configured for execution of:
balancing, via a cloud balancer, the mapping of buckets to the clouds to enable distributions of client API requests across the clouds.

16. The computer program product of claim 13, wherein the code is further configured for execution of:
sending a request to the cloud router, wherein the request is sent by the client; and
making a determination whether the client has permission to make the request.

17. The computer program product of claim 16 wherein the code is further configured for execution of:
validating the request from the client, wherein the validation is based upon making the determination whether the client has permission to make the request.

18. The computer program product of claim 16 wherein the code is further configured for execution of:
rejecting the request from the client, wherein the rejection is based upon making the determination whether the client has permission to make the request.

19. The computer program product of claim 17 wherein the code is further configured for execution of:
hashing a key in the request;
determining a bucket that corresponds to the hashed key;
converting the request into a request for a cloud; and
executing the converted request, wherein the request is executed by sending the request to the cloud.

20. The computer program product of claim 19 wherein the code is further configured for execution of:
mapping the buckets to at least one cloud.

* * * * *